US012654423B2

(12) United States Patent
Watanabe et al.

(10) Patent No.: US 12,654,423 B2
(45) Date of Patent: Jun. 16, 2026

(54) COMPOSITE SUBSTRATE, LAMINATE, METHOD FOR PRODUCING COMPOSITE SUBSTRATE, AND METHOD FOR PRODUCING LAMINATE

(71) Applicant: AGC Inc., Tokyo (JP)

(72) Inventors: Hiroshi Watanabe, Tokyo (JP); Yoji Yasui, Tokyo (JP)

(73) Assignee: AGC Inc., Tokyo (JP)

( * ) Notice: Subject to any disclaimer, the term of this patent is extended or adjusted under 35 U.S.C. 154(b) by 22 days.

(21) Appl. No.: 18/882,868

(22) Filed: Sep. 12, 2024

(65) Prior Publication Data

US 2025/0001732 A1 Jan. 2, 2025

Related U.S. Application Data

(63) Continuation of application No. PCT/JP2023/008935, filed on Mar. 8, 2023.

(30) Foreign Application Priority Data

| Mar. 15, 2022 | (JP) | ................................. | 2022-039884 |
| Jul. 28, 2022 | (JP) | ................................. | 2022-120201 |

(51) Int. Cl.
*B32B 15/04* (2006.01)
*B32B 9/00* (2006.01)
(Continued)

(52) U.S. Cl.
CPC .............. *B32B 15/04* (2013.01); *B32B 9/007* (2013.01); *B32B 37/24* (2013.01);
(Continued)

(58) Field of Classification Search
CPC .............................. B32B 9/007; C01B 32/188
(Continued)

(56) References Cited

U.S. PATENT DOCUMENTS

| 2010/0021708 A1* | 1/2010 | Kong | .................. | H10P 14/3406 |
| | | | | 428/688 |
| 2012/0196074 A1* | 8/2012 | Ago | ...................... | B82Y 40/00 |
| | | | | 977/734 |

(Continued)

FOREIGN PATENT DOCUMENTS

| WO | WO 2011/025045 A1 | 3/2011 | |
| WO | WO-2016104291 A1 * | 6/2016 | ........... C01B 32/184 |

OTHER PUBLICATIONS

International Search Report issued May 23, 2023 in PCT/JP2023/008935 filed on Mar. 8, 2023, 3 pages.

(Continued)

*Primary Examiner* — Lauren R Colgan
(74) *Attorney, Agent, or Firm* — Oblon, McClelland, Maier & Neustadt, L.L.P.

(57) ABSTRACT

The present invention relates to a composite substrate for graphene film production, the composite substrate including: a substrate having a thermal expansion coefficient of $2.0 \times 10^{-6}$ $(K^{-1})$ or less; an oxide film; and a metal film containing Cu or Ni, in this order, in which a prescribed diffraction peak is observed by XRD measurement for the metal film by a $\theta$-$2\theta$ method, and in a chart obtained by the XRD measurement, a diffraction peak derived other than the prescribed diffraction peak is not observed, or an intensity of diffraction peak other than the prescribed diffraction peak is $\frac{1}{10}$ or less of an intensity of the prescribed diffraction peak.

8 Claims, 10 Drawing Sheets

1

(51) Int. Cl.
B32B 17/06 (2006.01)
B32B 37/24 (2006.01)

(52) U.S. Cl.
CPC ..... *B32B 2037/246* (2013.01); *B32B 2250/04* (2013.01); *B32B 2307/7376* (2023.05); *B32B 2311/12* (2013.01); *B32B 2311/22* (2013.01); *B32B 2311/24* (2013.01); *B32B 2313/04* (2013.01); *B32B 2315/02* (2013.01)

(58) Field of Classification Search
USPC ................................ 428/698, 699, 701, 702
See application file for complete search history.

(56) References Cited

U.S. PATENT DOCUMENTS

| | | | |
|---|---|---|---|
| 2016/0108546 A1 | 4/2016 | Park et al. | |
| 2018/0265360 A1* | 9/2018 | Akiyama | .............. C01B 32/184 |
| 2019/0390366 A1* | 12/2019 | Ghyselen | .............. C30B 25/186 |

OTHER PUBLICATIONS

European Search Report dated Apr. 8, 2026, in Euopean Patent Application No. 23770604.9, (8 pages).
Reeber, et al., "Thermal expansion and molar volume of MgO, periclase, from 5 to 2900 K", Eur. J. Mineral., vol. 7, pp. 1039-1047, 1995 (10 pages).
Hu, et al., "Epitaxial growth of large-area single-layer graphene over Cu(111)/sapphire by atmospheric pressure CVD", Carbon, vol. 50, pp. 57-65, 2012 (9 pages).

* cited by examiner

1

6

(a)

(b)

(c)

(d)

(e)

(a)

(b)

(c)

(d)

(e)

(a)

(b)

(c)

(d)

(a)

(b)

(a)

(b)

COMPOSITE SUBSTRATE, LAMINATE, METHOD FOR PRODUCING COMPOSITE SUBSTRATE, AND METHOD FOR PRODUCING LAMINATE

CROSS-REFERENCE TO RELATED APPLICATIONS

This is a continuation of International Application No. PCT/JP2023/008935 filed on Mar. 8, 2023, and claims priority from Japanese Patent Applications No. 2022-039884 filed on Mar. 15, 2022 and No. 2022-120201 filed on Jul. 28, 2022, the entire content of which is incorporated herein by reference.

TECHNICAL FIELD

The present invention relates to a composite substrate, a laminate, a method for producing a composite substrate, and a method for producing a laminate.

BACKGROUND ART

One of substances made of carbon is graphene. It is reported that graphene is a sheet-shaped substance having a thickness of one atom containing $SP^2$ bonded carbon atoms, and may have carrier mobility higher than that of silicon, GaAs, and the like, and applications to devices such as a flexible transistor and a transparent electrode are studied.

In recent years, miniaturized antennas and a phase adjustment member using surface plasmon polariton (SPP) are studied. Graphene is expected as the antenna member and the phase adjustment member because graphene is superior to other materials such as metals in that it has good electrical conductivity in a terahertz band, low dielectric loss and low loss due to a skin effect, and can be used to prepare a small and high-density integrated element.

Patent Literature 1 discloses a technique relating to a graphene thin film composite having a single crystal substrate, an epitaxial metal film formed on the single crystal substrate, and a graphene thin film grown on a surface of the metal film.

CITATION LIST

Patent Literature

Patent Literature 1: WO 2011/025045

SUMMARY OF INVENTION

Technical Problem

From the viewpoints of electrical conductivity, electromagnetic wave absorption characteristics, surface plasmon polariton (SPP) characteristics, and the like, it is considered preferable for the graphene film to have fewer defects.

As a result of studying a method for producing a graphene film based on the technique disclosed in Patent Literature 1, it is found that, when the graphene film is formed on the surface of the metal film by a chemical vapor deposition (CVD) method or the like, the obtained graphene film may be partially folded over. If the above-described structural disturbance occurs frequently in the graphene film, characteristics of the graphene film, such as the electrical conductivity, the electromagnetic wave absorption characteristics, and the surface plasmon polariton (SPP) characteristics, may deteriorate. Therefore, a method for producing graphene film that can reduce these phenomena is required.

The present invention has been made in view of the above, and an object of the present invention is to provide a substrate for graphene film production that enables easy production of a graphene film having fewer defects in order to produce graphene having excellent various characteristics.

Further, an object of the present invention is to provide a substrate for graphene film production that enables easy production of a graphene film having fewer defects and, desirably, fewer folds.

Another object of the present invention is to provide a laminate, a method for producing a composite substrate, and a method for producing a laminate.

Solution to Problem

As a result of intensive studies in view of the above problems, the present inventors have found that a desired effect can be obtained, and have completed the present invention.

That is, the present inventors have found that the above problems can be solved by the following configurations.

[1] A composite substrate for graphene film production, the composite substrate including: a substrate having a thermal expansion coefficient of $2.0 \times 10^{-6}$ $(K^{-1})$ or less; an oxide film; and a metal film containing Cu or Ni, in this order, in which the composite substrate satisfies a requirement 1 or a requirement 2 to be described later.

[2] The composite substrate according to [1], in which the metal film has a thickness of 50 nm to 2000 nm.

[3] The composite substrate according to [1] or [2], in which the oxide film has a thickness of 10 nm to 2000 nm.

[4] The composite substrate according to any one of [1] to [3], in which the oxide film contains MgO or $Al_2O_3$.

[5] The composite substrate according to any one of [1] to [4], in which the substrate has a thickness of 0.2 mm or more.

[6] A laminate including: the composite substrate according to any one of [1] to [5]; and a graphene film disposed on the metal film contained in the composite substrate.

[7] A method for producing the composite substrate according to any one of [1] to [5], the method including: forming the oxide film on a surface of the substrate by a method selected from the group consisting of sputtering, pulsed laser deposition, and vapor deposition; and then forming the metal film on a surface of the oxide film by a method selected from the group consisting of sputtering, pulsed laser deposition, and vapor deposition.

[8] A method for producing the laminate according to [6], the method including: forming the graphene film on a surface of the metal film contained in the composite substrate by chemical vapor deposition.

Advantageous Effects of Invention

According to the present invention, it is possible to provide a substrate for graphene film production that enables easy production of a graphene film having fewer defects.

In addition, it is possible to provide a substrate for graphene film production that enables easy production of a graphene film having fewer defects and, desirably, fewer folds.

DESCRIPTION OF EMBODIMENTS

Hereinafter, an embodiment of the present invention will be described with reference to the drawings. However, the present invention is not limited to the following embodiment. Various modifications and substitutions can be made in the following embodiment without departing from the scope of the present invention.

The terms used in the present invention have the following meanings.

A numerical range represented using "to" means a range including numerical values described before and after "to" as a lower limit value and an upper limit value.

A "half-width" means a full width at half maximum (FWHM).

[Composite Substrate]

Figure 1:
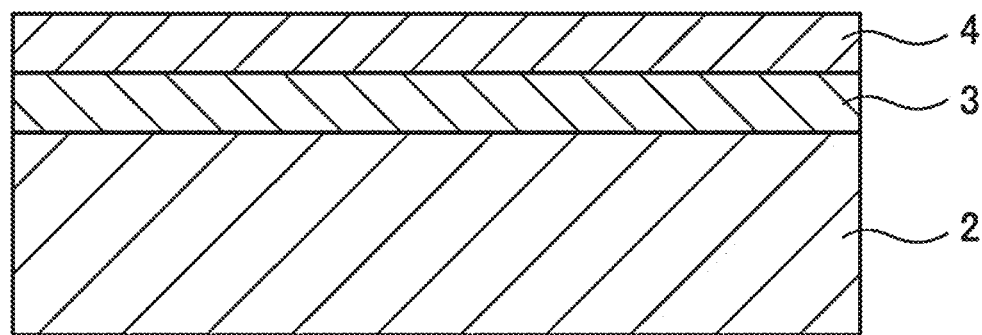
FIG. 1 is a schematic cross-sectional view illustrating an example of a configuration of a composite substrate.

FIG. 1 is a cross-sectional view schematically illustrating a composite substrate according to one embodiment of the present invention.

As shown in FIG. 1, a composite substrate 1 for graphene film production according to the present embodiment includes a substrate 2 having a thermal expansion coefficient of $2.0 \times 10^{-6}$ ($K^{-1}$) or less, an oxide film 3, and a metal film 4 containing Cu or Ni, in this order.

The composite substrate 1 according to the present embodiment satisfies the following requirement 1 or requirement 2.

Requirement 1: the metal film contains Cu, a diffraction peak 1A derived from either a (111) plane or a (100) plane is observed by XRD measurement for the metal film by a θ-2θ method, and in a chart obtained by the XRD measurement, a diffraction peak derived from a lattice plane of a Cu crystal other than the diffraction peak 1A (hereinafter, also referred to as a "diffraction peak 1B") is not observed, or an intensity of any of the diffraction peak 1B is ¹⁄₁₀ or less of an intensity of the diffraction peak 1A.

Requirement 2: the metal film contains Ni, a diffraction peak 2A derived from a (111) plane is observed by XRD measurement for the metal film by a θ-2θ method, and in a chart obtained by the XRD measurement, a diffraction peak derived from a lattice plane of a Ni crystal other than the diffraction peak 2A (hereinafter, also referred to as a "diffraction peak 2B") is not observed, or an intensity of any of the diffraction peak 2B is ¹⁄₁₀ or less of an intensity of the diffraction peak 2A.

As a method for producing a graphene film, a method for forming a graphene film on a metal film formed on a surface of a substrate by a CVD method or the like is known.

From the viewpoint of improving various characteristics such as electrical conductivity, electromagnetic wave absorption characteristics, and surface plasmon polariton (SPP) characteristics, it is preferable that the graphene film has fewer defects. The present inventors have found that, by using a composite substrate having the configuration according to the present invention, a graphene film having fewer defects can be produced. That is, the composite substrate according to the present embodiment satisfies the above requirement 1 or requirement 2, and thus enables formation of a highly oriented epitaxial graphene film on the surface of the metal film.

Further, it is found that, when the graphene film is formed by the above method, the obtained graphene film may have many folds. In the case where the graphene film has many folds (wrinkles), layers constituting the graphene film do not extend uniformly in an in-plane direction, and various characteristics such as the electrical conductivity, the electromagnetic wave absorption characteristics, and the surface plasmon polariton (SPP) characteristics tend to deteriorate.

As a result of studies on a phenomenon in which the fold occurs in the graphene film, the present inventors have found that the phenomenon is caused by a thermal expansion coefficient of a substrate. That is, it is found that, in the case where the graphene film is formed using a substrate having a high thermal expansion coefficient, such as a single crystal substrate, when graphene is grown on the surface of the metal film in a high-temperature environment, and then the graphene film-attached substrate is cooled, the substrate thermally contracts, causing the graphene film to fold.

In contrast, the composite substrate according to the present embodiment satisfies the above requirement 1 or requirement 2, and thus allows a highly oriented epitaxial graphene film to be formed on the surface of the metal film. Meanwhile, since the composite substrate has a substrate having a low thermal expansion coefficient, contraction of the substrate is prevented even when the substrate is cooled to 20° C. to 25° C. after the graphene film is formed, and therefore, the fold of the graphene film can be prevented. As a result, various characteristics of the graphene film can be improved.

The "fold" of the graphene film will be described in more detail later.

In order to satisfy the requirement 1, the metal film needs to contain Cu, and in order to satisfy the requirement 2, the metal film needs to contain Ni.

A material constituting each film including the metal film can be identified for each film, for example, by cutting the composite substrate or the laminate in a thickness direction using a focused ion beam (FIB) device and measuring a cross section of each exposed film using a transmission electron microscope (TEM) or a scanning electron microscope (SEM) and an energy dispersive X-ray analysis (EDX) device.

The XRD measurement by the θ-2θ method is a measurement method in which a detection unit is rotated by 2θ simultaneously with the rotation of a sample by θ with respect to incident X-rays in X-ray diffraction. CuKα rays are used as the incident X-rays.

In the present specification, for example, in a chart, when the diffraction peak 1A derived from a (111) plane is observed at 2θ=x (°) and a diffraction peak derived from a (222) plane is observed at 2θ=2x (°), as diffraction peaks derived from a lattice plane of a Cu crystal, the diffraction peak derived from the (222) plane is not treated as the diffraction peak corresponding to the "diffraction peak 1B" in the determination of the requirement 1. When the diffraction peak derived from the (222) plane is observed, a peak intensity of the diffraction peak observed at 2θ=2x (°) is not included in either an "intensity of the diffraction peak 1B" nor an "intensity of the diffraction peak 1A" in the determination of the requirement 1. Therefore, the "intensity of the diffraction peak 1A" is the peak intensity of only the diffraction peak observed at 2θ=x (°).

In addition, in the present specification, in a chart obtained by the XRD measurement by the θ-2θ method (2θ=20° to 80°, in the case where there are a diffraction peak X having a maximum peak intensity and a diffraction peak Y having a peak intensity smaller than the diffraction peak X, among diffraction peaks derived from a lattice plane of a certain crystal, and a ratio Y/X of the peak intensity of the diffraction peak Y to the peak intensity of the diffraction peak X is less than $\frac{1}{50}$, the diffraction peak Y is treated as a peak that is not observed.

For the determination of the requirements 1 and 2, a case where a diffraction peak derived from the (111) plane of the Cu crystal is observed in a chart obtained by the XRD measurement for the metal film containing Cu will be described as an example. In the example, in the case where the diffraction peak derived from the (100) plane of the Cu crystal and any of a diffraction peak derived from the lattice plane of the Cu crystal other than the (111) plane and the (100) plane correspond to the "peak that is not observed", or have only an intensity of $\frac{1}{10}$ or less of the intensity of the diffraction peak derived from the (111) plane, it is determined that the metal film containing Cu satisfies the requirement 1. On the other hand, when there is at least one diffraction peak on the chart that has an intensity exceeding $\frac{1}{10}$ of the intensity of the diffraction peak derived from the (111) plane among the diffraction peak derived from the (100) plane of the Cu crystal and the other diffraction peak derived from the lattice plane of the Cu crystal other than the (111) plane and the (100) plane, it is determined that the metal film containing Cu does not satisfy the requirement 1.

The lattice plane of the Cu crystal from which the diffraction peak 1B can be derived can be acquired from a known database, and examples thereof include one of the (111) plane and the (100) plane, that is, a lattice plane from which the diffraction peak 1A is not derived, and a (220) plane, a (311) plane, and a (331) plane.

The lattice plane of the Ni crystal from which the diffraction peak 2B may be derived can be acquired from a known database, and examples thereof include a (200) plane, a (220) plane, a (311) plane, and a (331) plane.

Hereinafter, members included in the composite substrate according to the present embodiment will be described in more detail.

[Substrate]

The thermal expansion coefficient of the substrate included in the composite substrate according to the present embodiment is $2.0\times10^{-6}$ (K$^{-1}$) or less. Accordingly, defects in the graphene film formed using the composite substrate can be reduced, and folds of the graphene film can be reduced.

The thermal expansion coefficient of the substrate is preferably $1.5\times10^{-6}$ (K$^{-1}$) or less, and more preferably $1.0\times10^{-6}$ (K$^{-1}$) or less, in terms of reducing defects of the graphene film formed using the composite substrate and further reducing the folds. A lower limit of the thermal expansion coefficient of the substrate is, for example, $-10.0\times10^{-6}$ (K$^{-1}$).

In the specification, the thermal expansion coefficient means a thermal expansion coefficient at 300K.

Examples of a material constituting the substrate having the thermal expansion coefficient in the above range include quartz such as synthetic quartz, fused quartz, and sintered quartz. The substrate preferably contains quartz, and more preferably contains synthetic quartz.

Examples of commercially available products of the substrate include "AQ" and "QJ" manufactured by AGC Electronics Inc.

The thickness of the substrate is preferably 0.2 mm or more, more preferably 0.5 mm or more, and still more preferably 1 mm or more, in terms of reducing defects in the graphene film to be formed and further preventing the occurrence of the folds during the formation of the graphene film. An upper limit value of the thickness of the substrate is, for example, 10 mm.

A size of the substrate is appropriately adjusted according to the application of the composite substrate. An area of the substrate is, for example, 1 mm$^2$ to 1,000,000 mm$^2$, and preferably 100 mm$^2$ to 10,000 mm$^2$.

(Oxide Film)

The composite substrate according to the present embodiment includes an oxide film between the substrate and the metal film.

Examples of the material constituting the oxide film include oxides of metals such as alkaline earth metals, transition metals, and rare earth metals. Among these, MgO (magnesium oxide), Al$_2$O$_3$ (sapphire), LaAlO$_3$, or TiO$_2$ is preferable, and MgO or Al$_2$O$_3$ is more preferable.

The composite substrate according to the present embodiment preferably satisfies the following requirement 3 or requirement 4.

Requirement 3: The oxide film contains MgO, and a diffraction peak 3A derived from a (111) plane is observed by XRD measurement for the oxide film by a θ-2θ method, and in a chart obtained by the XRD measurement, a diffraction peak derived from a lattice plane of a MgO crystal other than the diffraction peak 3A (hereinafter, also referred to as a "diffraction peak 3B") is not observed, or an intensity of any of the diffraction peak 3B is $\frac{1}{10}$ or less of an intensity of the diffraction peak 3A.

Requirement 4: The oxide film contains Al$_2$O$_3$, and a diffraction peak 4A derived from a (0001) plane is observed by XRD measurement for the oxide film by a θ-2θ method, and in a chart obtained by the XRD measurement, a diffraction peak derived from a lattice plane of a Al$_2$O$_3$ crystal other than the diffraction peak 4A (hereinafter, also referred to as a "diffraction peak 4B") is not observed, or an intensity of any of the diffraction peak 4B is $\frac{1}{10}$ or less of an intensity of the diffraction peak 4A.

The lattice plane of the MgO crystal from which the diffraction peak 3B may be derived can be obtained from a known database, and examples thereof include a (200) plane, a (220) plane, a (311) plane, and a (111) plane.

The lattice plane of the $Al_2O_3$ crystal from which the diffraction peak 4B can be derived can be obtained from a known database, and examples thereof include the (0001) plane and a (11-20) plane.

For example, when the composite substrate according to the present embodiment forms a metal film containing Cu on the surface of the oxide film satisfying the requirement 3, a metal film having a crystal plane of the (100) plane or the (111) plane and having more excellent orientation can be obtained. In addition, by forming a metal film containing Ni on the surface of the oxide film, a metal film having a crystal plane of the (111) plane and more excellent orientation can be obtained. It is known that when graphene is formed on a highly oriented metal film containing Cu, the formed graphene has fewer defects.

Similarly, when the composite substrate forms a metal film containing Cu on the surface of the oxide film satisfying the requirement 4, a metal film having a crystal plane of the (100) plane or the (111) plane and having more excellent orientation can be obtained. In addition, by forming a metal film containing Ni on the surface of the oxide film, a metal film having a crystal plane of the (111) plane and more excellent orientation can be obtained.

The thickness of the oxide film is preferably 5 nm to 3000 nm, more preferably 10 nm to 2000 nm, still more preferably 50 nm to 1500 nm, and particularly preferably 200 nm to 1200 nm, in terms of excellent crystallinity and orientation of the metal film disposed on the surface of the oxide film in a balanced manner and further preventing the folds in the graphene film. The thickness of the oxide film is preferably 5 nm or more, more preferably 10 nm or more, still more preferably 50 nm or more, and particularly preferably 200 nm or more, and is preferably 3000 nm or less, more preferably 2000 nm or less, still more preferably 1500 nm or less, and particularly preferably 1200 nm or less.

When the oxide film is formed, the oxide film is preferably formed on at least one surface of the substrate.

Examples of a method for forming the oxide film on the surface of the substrate include known film forming techniques such as sputtering such as pulsed sputtering, AC sputtering, and digital sputtering; pulsed laser deposition (PLD); vapor deposition; atomic layer deposition (ALD); molecular beam epitaxy (MBE); and chemical vapor deposition (CVD).

Among these, the sputtering, the pulsed laser deposition (PLD), or the vapor deposition is preferable, and the digital sputtering or ion plating is more preferable in terms of ease of controlling the thickness of the oxide film.

For example, when the oxide film is formed by the pulsed sputtering, the substrate is placed in a chamber in a mixed gas atmosphere of an inert gas and an oxygen gas, and a target is selected to have a desired composition for the formation of the film.

When a film of a metal oxide is formed by the digital sputtering, first, a substrate is disposed in a first chamber in an inert gas atmosphere, and a metal thin film is formed using a sputtering target made of a metal. Subsequently, the substrate is transferred into a second chamber in a mixed gas atmosphere of an inert gas and an oxygen gas to oxidize the metal thin film. By repeating the formation and oxidation of the metal thin film, a metal oxide film having a desired thickness can be formed.

Production conditions for forming the oxide film by sputtering may be appropriately adjusted according to a type, a thickness, and the like of the oxide film to be formed. A temperature of the substrate in a heat treatment is, for example, 150° C. to 600° C., and preferably 300° C. to 500° C. A heat treatment time is, for example, 1 minute to 300 minutes.

After the oxide film is formed by the above-described method, it is preferable to perform a post-heat treatment. This is because the post-heat treatment further improves the orientation of the oxide film.

The temperature of the post-heat treatment is, for example, 200° C. to 700° C., and preferably 300° C. to 500° C. A post-heat treatment time is, for example, 1 minute to 300 minutes.

(Metal Film)

The metal film of the composite substrate according to the present embodiment is configured to contain Cu or Ni and satisfy the requirement 1 or the requirement 2.

The metal film included in the composite substrate according to the present embodiment has a surface periodic structure that matches a hexagonal structure of graphene and has a (100) plane or (111) plane having excellent orientation. Therefore, when the composite substrate according to the present embodiment is used to prepare a graphene film and a carbon material is brought into contact with the surface of the metal film, epitaxial growth of the graphene film is promoted, and a highly oriented graphene film can be formed.

In the case where the composite substrate satisfies the requirement 1, in terms of being able to form a graphene film having excellent orientation, in a chart obtained by the XRD measurement for the metal film, it is preferable that the diffraction peak 1B is not observed or the intensity of any of diffraction peak 1B is 1/30 or less of the intensity of the diffraction peak 1A, and it is more preferable that the diffraction peak 1B is not observed (the intensity of any of the diffraction peak 1B is less than 1/50 of the intensity of the diffraction peak 1A).

In the case where the composite substrate satisfies the requirement 2, in terms of being able to form a graphene film having excellent orientation, in a chart obtained by the XRD measurement for the metal film, it is preferable that the diffraction peak 2B is not observed or the intensity of any of diffraction peak 2B is 1/30 or less of the intensity of the diffraction peak 2A, and it is more preferable that the diffraction peak 2B is not observed (the intensity of any of the diffraction peak 2B is less than 1/50 of the intensity of the diffraction peak 2A).

Such a metal film can be formed by forming a metal film on an oxide film having excellent orientation, adjusting the thickness of the oxide film, adjusting a film formation temperature, and adjusting a film formation pressure.

In terms of being able to form a graphene film having more excellent crystallinity, the metal film is preferably a metal film in which a half-width of the diffraction peak 1A or the diffraction peak 2A observed in the chart obtained by the XRD measurement for the above-described metal film is 0.20° or less, more preferable a metal film in which the half-width is 0.16° or less, and still more preferable a metal film in which the half-width is 0.15° or less. The lower limit of the half-width is preferably 0.01°.

The thickness of the metal film is, for example, 10 nm to 5000 nm, and is preferably 50 nm to 2000 nm, and more preferably 100 nm to 1000 nm in terms of more excellent film formability of the graphene film. The thickness of the metal film is, for example, 10 nm or more, preferably 50 nm or more, and more preferably 100 nm or more, and is, for example, 5000 nm or less, preferably 2000 nm or less, and more preferably 1000 nm or less.

The thickness of each film included in the composite substrate or a laminate to be described later is determined by measuring at a magnification of 50,000 times using a scanning electron microscope (SEM). Examples of the SEM include "SU-70" manufactured by Hitachi High-Tech Corporation.

When the metal film is formed, the metal film is preferably formed on the surface of the oxide film of an oxide film-attached substrate prepared by the above-described method.

Examples of the method for forming the metal film on the surface of the oxide film include methods described in the methods for forming the oxide film. Among these, the sputtering, the pulsed laser deposition (PLD), or the vapor deposition is preferable, and the sputtering is more preferable.

Heat treatment conditions for the oxide film-attached substrate in forming the metal film by the sputtering may be appropriately adjusted according to the types of the substrate, the oxide film, and the metal film, the thickness of the metal film, and the like. A temperature of the substrate in a heat treatment is, for example, 20° C. to 800° C., and preferably 200° C. to 500° C. A heat treatment time is, for example, 1 minute to 300 minutes.

After the metal film is formed by the above-described method, it is preferable to perform a post-heat treatment. This is because the post-heat treatment further improves the orientation of the metal film.

The temperature of the post-heat treatment is, for example, 200° C. to 1000° C., and preferably 500° C. to 700° C. A post-heat treatment time is, for example, 1 minute to 300 minutes.

(Method for Producing Composite Substrate)

As the method for producing the composite substrate, a method capable of producing the composite substrate including the substrate, the oxide film, and the metal film, in this order and satisfying the requirement 1 or requirement 2 can be applied.

Examples of the method for producing the composite substrate include a method in which the oxide film is formed on at least one surface of the substrate according to the above-described method for forming the oxide film, and then the metal film is formed on a surface of the oxide film according to the above-described method for forming the metal film. The method for forming the oxide film and the method for forming the metal film in this case are the same as those already described, including the preferred embodiments.

As described above, the composite substrate according to the present embodiment is useful as a substrate for producing a graphene film in that a graphene film with few defects can be formed and a graphene film with few folds can be formed. In particular, the composite substrate according to the present embodiment is preferably used for the production of a graphene film having a thickness of three layers or less, and more preferably used for the production of a graphene film having only one layer (hereinafter, also referred to as a "graphene single film"), in terms of being able to prevent the occurrence of folds when forming a graphene film having a small number of layers and easily affected by thermal contraction.

[Laminate]

Figure 2:
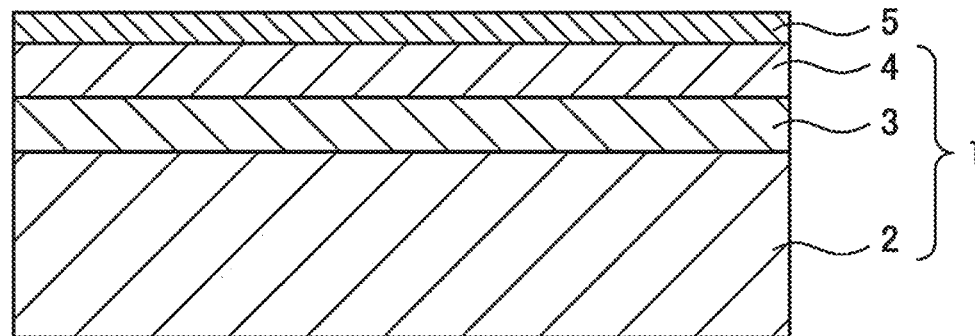
FIG. 2 is a schematic cross-sectional view illustrating an example of a configuration of a laminate.

FIG. 2 is a cross-sectional view schematically illustrating the laminate according to one embodiment of the present invention.

As shown in FIG. 2, a laminate 6 according to the present embodiment includes the composite substrate 1 having the substrate 2, the oxide film 3, and the metal film 4, in this order, and a graphene film 5 disposed on a surface of the metal film 4 included in the composite substrate 1.

The composite substrate 1, the substrate 2, the oxide film 3, and the metal film 4 included in the laminate 6 are as described above.

(Graphene Film)

The graphene film included in the laminate according to the present embodiment will be described.

The graphene film is a sheet-shaped member having a hexagonal lattice structure made of carbon atoms. The graphene film included in the laminate according to the present embodiment is characterized by having few defects. Further, the graphene film included in the laminate according to the present embodiment is characterized in that the occurrence of the fold can be prevented.

In the specification, the "fold" of the graphene film means an overlapping portion in a normal direction which is originally generated in the graphene extending in the in-plane direction, such as a state where at least one layer constituting the graphene film is folded in the in-plane direction and laminated, or a state where at least one layer constituting the graphene film is bent in the normal direction of the graphene film and so-called "wrinkles" are generated.

The fold of the graphene film can be detected by measuring the graphene film by Raman spectroscopy and comparing an intensity of a 2D band with an intensity of a G band in the obtained mapping. For example, the intensity of the 2D band is larger than the intensity of the G band in the graphene single film, the intensity of the 2D band is substantially equal to the intensity of the G band in a two-layer graphene film, and the intensity of the 2D band is smaller than the intensity of the G band in a multilayer graphene film including three or more layers. The number of layers can also be estimated from a half-width of the 2D band, and the half-width of the 2D band may be 20 $cm^{-1}$ to 35 $cm^{-1}$ for the graphene single film, 35 $cm^{-1}$ to 55 $cm^{-1}$ for the two-layer graphene film, and 40 $cm^{-1}$ to 70 $cm^{-1}$ for the multilayer graphene film.

The number of layers of the graphene film is preferably 3 or less, more preferably 1 or 2, and still more preferably 1. The graphene single film including only one layer can detect, amplify, or oscillate an electromagnetic wave in a wide band including a terahertz band using a principle of surface plasmon polariton (SPP).

The number of layers of the graphene film can be measured by mapping measurement based on the Raman spectroscopy.

The size of the graphene film in the in-plane direction is appropriately adjusted according to the use of the laminate or the graphene film, and is, for example, 1 $mm^2$ to 1,000, 000 $mm^2$.

The thermal expansion coefficient of graphene is said to be $(-8.0\pm0.7)\times10^{-6}$ $(K^{-1})$, and it is preferable that the thermal expansion coefficient of the graphene film is also within the above range.

In the laminate, a difference between the thermal expansion coefficient of the substrate and the thermal expansion coefficient of the graphene film is preferably $2\times10^{-6}$ $(K^{-1})$ or less, and more preferably $1\times10^{-6}$ $(K^{-1})$ or less, in terms of reducing defects in the graphene film and further reducing folds in the graphene film.

Carrier mobility of the graphene film is preferably 1000 $(cm^2/V\cdot s)$ or more, and more preferably 3000 $(cm^2/V\cdot s)$ or more. A graphene film having the carrier mobility within the above range is excellent in various characteristics such as an SPP radio wave characteristics. The upper limit value of the carrier mobility of the graphene film is usually 20000 $(cm^2/V\cdot s)$.

The graphene film included in the laminate according to the present embodiment can be formed by bringing the carbon material into contact with the surface of the metal film included in the composite substrate.

The graphene film is preferably formed by chemical vapor deposition (CVD) in which graphene is grown by bringing gaseous carbon-containing molecules into contact with the surface of the metal film under a pressure equal to or lower than an atmospheric pressure.

Examples of the carbon-containing molecules used for forming the graphene film include hydrocarbon and heteroatom-containing molecules.

The hydrocarbon is preferably a hydrocarbon having 10 or less carbon atoms, and more preferably a hydrocarbon having 5 or less carbon atoms. Specific examples of the hydrocarbon include methane, ethane, ethylene, acetylene, propane, propylene, butane, butadiene, pentane, pentene, cyclopentadiene, hexane, cyclohexane, benzene, and toluene. These may be used alone or in combination of two or more thereof.

The heteroatom-containing molecule is preferably a heteroatom-containing hydrocarbon having 10 or less carbon atoms, and more preferably a hydrocarbon having 5 or less carbon atoms and containing a heteroatom selected from oxygen, nitrogen and boron. Specific examples of the heteroatom-containing molecule include alcohols such as methanol and ethanol, and carbon monoxide.

In the CVD, the carbon-containing molecules are preferably supplied at a constant pressure into a chamber in which a composite substrate including an epitaxial metal film on a surface thereof is disposed. Examples of a method for supplying the carbon-containing molecules include a method for supplying the gaseous carbon-containing molecules into a chamber together with an inert gas such as helium and argon and a hydrogen gas.

A pressure of the carbon-containing molecules in the chamber is, for example, equal to or lower than the atmospheric pressure, and is preferably $10^{-5}$ Pa to 105 Pa, and more preferably $10^{-3}$ Pa to 105 Pa. A heat treatment temperature is preferably 300° C. to 1200° C., and more preferably 500° C. to 1000° C., in that the graphene film is formed at a high speed and a graphene film with few defects can be obtained. A heat treatment time is preferably 1 minute to 300 minutes, and more preferably 10 minutes to 60 minutes.

Examples of heating methods for the heat treatment include, for example, induction heating, radiant heat, lasers, infrared rays, microwaves, plasma, and ultraviolet rays.

Before forming the graphene film by the CVD, the metal film of the composite substrate is preferably hydrogen-annealed at a temperature lower than that of the CVD. The surface of the metal film is reduced by the hydrogen annealing, and crystallinity of the surface of the metal film under a high temperature for performing the CVD can be improved. Specifically, aggregation of a catalyst metal or generation of pits on the surface of the metal film is reduced by the hydrogen annealing at a low temperature, enabling an epitaxial growth of a large-area graphene film. It is also effective to perform the hydrogen annealing at a CVD temperature after performing the hydrogen annealing at the low temperature.

The composite substrate is hydrogen-annealed by placing the composite substrate in a chamber used for the CVD and heating the composite substrate. A temperature for the hydrogen annealing is, for example, 400° C. to 600° C. An annealing time is preferably 30 minutes to 300 minutes in terms of improving the crystallinity of the metal film and quality of the graphene film. In the hydrogen annealing, hydrogen is supplied into the chamber together with the inert gas. A supply amount of hydrogen at this time is, for example, 400 sccm to 600 sccm.

(Other Layers)

The laminate may freely include a composite substrate (substrate, oxide film, and metal film) and a layer other than the graphene film. Examples of other layers that may be included in the laminate include an electrode, an insulating layer, and a protective layer.

Hereinafter, a method for producing the laminate according to the present embodiment will be described with reference to the drawings.

Figure 3:
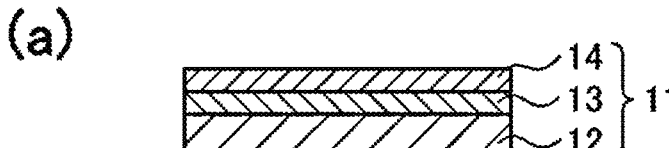
FIG. 3 (a) to (e) of FIG. 3 are schematic diagrams illustrating an example of a method for producing the laminate.
Figure 3:
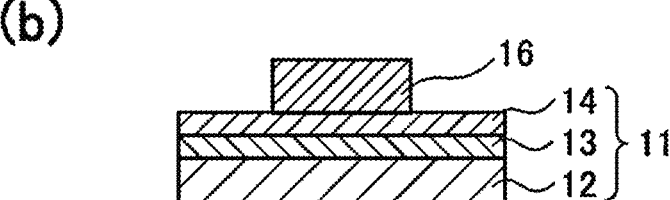
Figure 3:
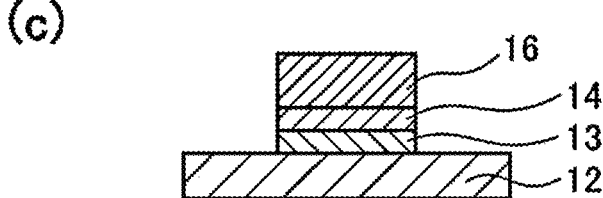
Figure 3:
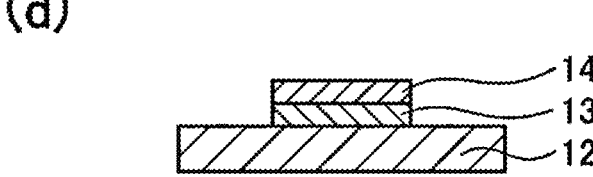
Figure 3:
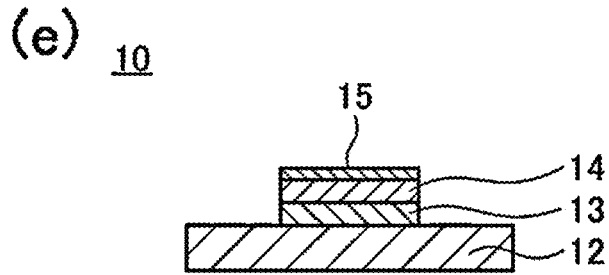

(a) to (e) of FIG. 3 are schematic diagrams illustrating an example of a method for producing a laminate 10 according to the present embodiment.

First, as shown in (a) of FIG. 3, a composite substrate 11 including a substrate 12, an oxide film 13, and a metal film 14, in this order is prepared. The composite substrate 11 is as described above.

Next, as shown in (b) of FIG. 3, a resist film 16 is pattern-formed on a surface of the metal film 14. The resist film 16 can be formed using a known technique such as photolithography and electron beam lithography.

Next, as shown in (c) of FIG. 3, a portion of the metal film 14 not covered with the resist film 16 is removed together with the oxide film 13 disposed under the portion. The metal film 14 and the oxide film 13 can be removed by being brought into contact with a treatment liquid such as hydrochloric acid, an aqueous solution of iron chloride, or hydrofluoric acid. A type of the treatment liquid is appropriately selected from known liquids according to the types of the oxide film and the metal film. Examples of being brought into contact with a treatment liquid include a method for immersing the laminate in the treatment liquid at a temperature of 0 to 100° C. for 10 minutes to 1 week. The oxide film and the metal film may be removed in separate, independent processes.

Next, as shown in (d) of FIG. 3, the resist film 16 disposed on the surface of the metal film 14 is removed. The resist film 16 can be removed by using a known developer such as an organic solvent or an alkaline solution depending on the material constituting the resist film 16.

Next, as shown in (e) of FIG. 3, the laminate 10 including the substrate 12, the oxide film 13, the metal film 14, and a graphene film 15, in this order is produced by forming the graphene film 15 on the surface of the metal film 14. The method for forming the graphene film 15 is as described above.

(Uses of Laminate)

The laminate according to the present embodiment has few defects. Further, the fold can be reduced, and the carrier mobility is high. Therefore, the laminate according to the present embodiment can be suitably used for an electromagnetic wave detection element, an electromagnetic wave sensor, an electronic device, and a structure that can be miniaturized. In particular, a laminate including a graphene single film with excellent SPP propagation characteristics can be preferably used as a detection element, an amplification element, and an oscillation element for an electromagnetic wave in a wide band.

Hereinafter, a method for producing an element including a graphene film using the laminate according to the present embodiment will be described with reference to the drawings. (a) to (e) of FIG. 4 are schematic diagrams illustrating an example of a method for producing the element including the graphene film.

Figure 4:
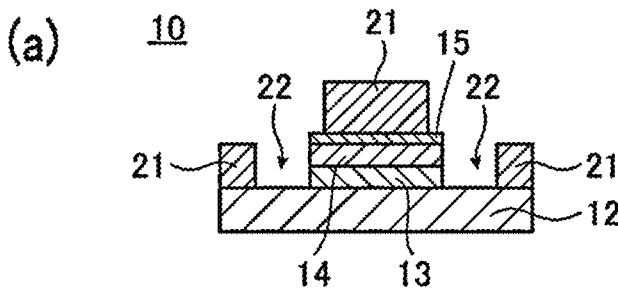
FIG. 4 (a) to (e) of FIG. 4 are schematic diagrams illustrating an example of a method for producing an element having a graphene film.
Figure 4:
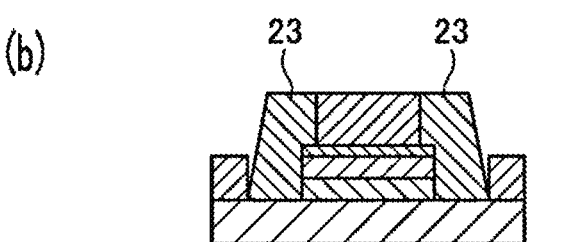
Figure 4:
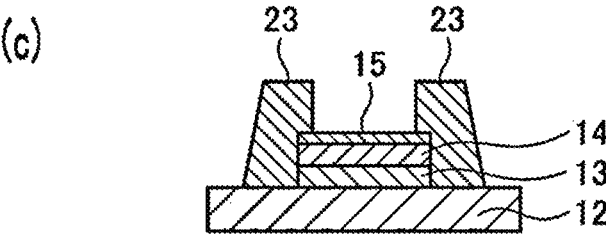
Figure 4:
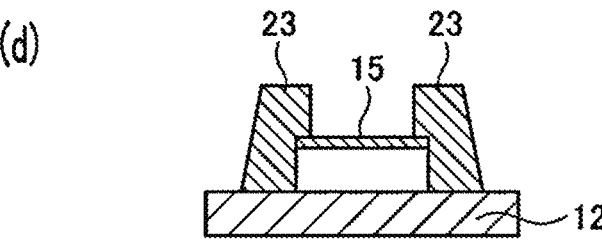
Figure 4:
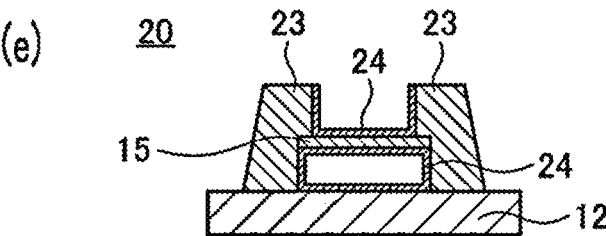

First, as shown in (a) of FIG. 4, a resist film 21 is pattern-formed on the laminate 10 including the substrate 12, the oxide film 13, the metal film 14, and the graphene film 15, in this order (see (e) of FIG. 3). The resist film 21 can be formed by a known technique such as photolithography and electron beam lithography using a known resist material. Openings 22 are formed in the resist film 21, and upper surfaces and side surfaces of both end portions of the graphene film 15 are exposed in the openings 22.

Next, as shown in (b) of FIG. 4, two electrodes 23 are formed on portions of the resist film 21 where the openings 22 are not covered so as to cover the upper surfaces and the side surfaces of both end portions of the graphene film 15. The electrode 23 is formed by a lift-off method using a known conductive material.

Next, as shown in (c) of FIG. 4, the resist film 21 covering a part of the graphene film 15 and a part of the substrate 12 is removed. The resist film 21 can be removed by using a known developer such as an organic solvent or an alkaline solution depending on the material constituting the resist film 21.

Next, as shown in (d) of FIG. 4, the oxide film 13 and the metal film 14 remaining between the substrate 12 and the graphene film 15 are removed. The oxide film 13 and the metal film 14 can be removed by, for example, a wet etching process using a treatment liquid such as hydrochloric acid, an aqueous solution of iron chloride, and hydrofluoric acid. Even after the oxide film 13 and the metal film 14 are removed, the graphene film 15 is held by the electrodes 23 from the sides of both end portions, so that the graphene film 15 is suspended between the electrodes 23.

Next, as shown in (e) of FIG. 4, an insulating film 24 covering an exposed surface of the graphene film 15 is formed to obtain an element 20. The insulating film 24 also functions as a support film for the graphene film 15. Examples of the material of the insulating film 24 include a hafnium oxide, an aluminum oxide, a silicon oxide, and a titanium oxide. Examples of a method for forming the insulating film 24 include a method for depositing the above material by atomic layer deposition (ALD) or chemical vapor deposition (CVD).

The insulating film 24 shown in (e) of FIG. 4 is a film formed by the ALD. When the insulating film is formed by the CVD, the exposed surface of the graphene film 15 opposite the substrate 12 is covered with an insulating film, but the exposed surface of the graphene film 15 facing the substrate 12 is not covered with an insulating film.

Therefore, the element 20 including the graphene film 15 is produced.

In the above method, the element can be produced without transferring the formed graphene film. Therefore, it is possible to avoid occurrence of breakage or structural defects in the graphene film due to peeling and attachment of the graphene film.

Another example of the method for producing an element including a graphene film using the laminate according to the embodiment will be described. (a) to (d) of FIG. 5 are schematic diagrams illustrating another example of a method for producing the element including the graphene film.

First, as shown in (a) of FIG. 5, according to the method described with reference to (a) to (c) of FIG. 4, the laminate 10 including the substrate 12, the oxide film 13, the metal film 14, the graphene film 15, and the two electrodes 31 covering the upper surfaces and the side surfaces of both end portions of the graphene film 15 is prepared.

Figure 5:
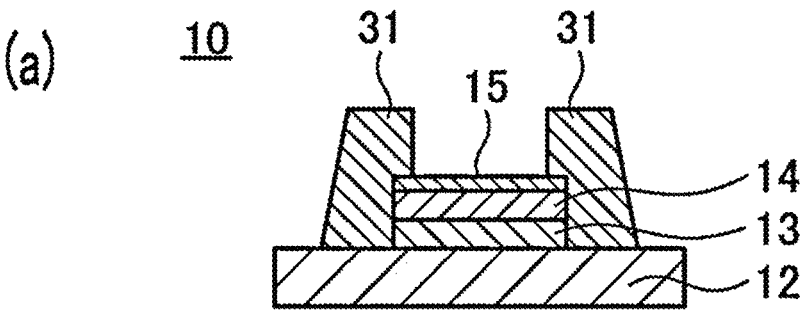
FIG. 5 (a) to (d) of FIG. 5 are schematic diagrams illustrating another example of the method for producing the element having the graphene film.
Figure 5:
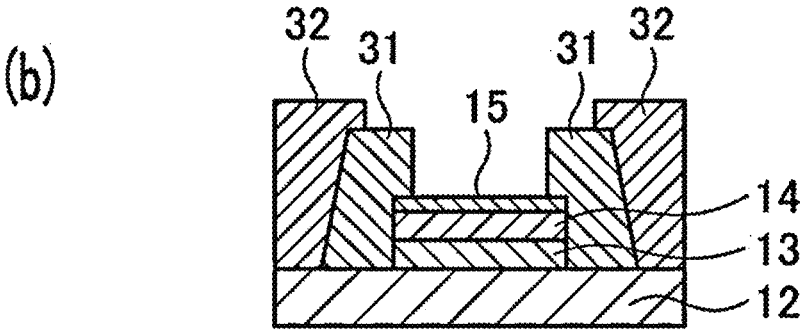
Figure 5:
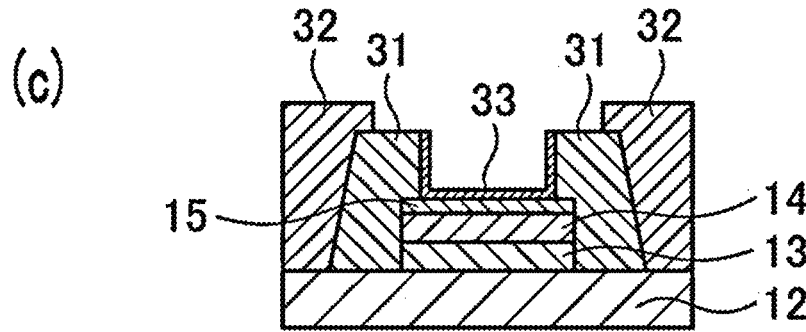
Figure 5:
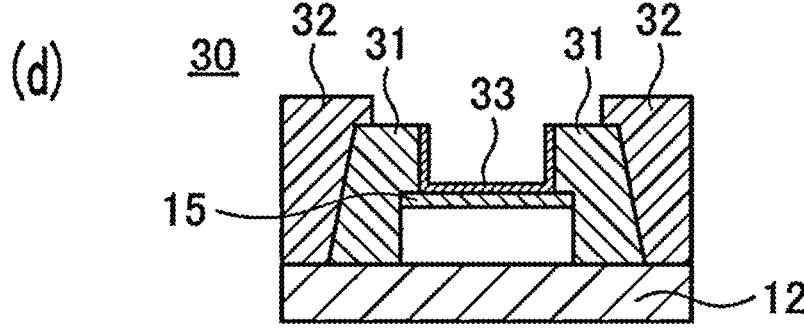

Next, as shown in (b) of FIG. 5, resist films 32 covering a part of each of the two electrodes 23 are formed. A method for forming the resist film 32, the constituent materials, and the like are as described above.

Next, as shown in (c) of FIG. 5, the oxide film 13 and the metal film 14 remaining between the substrate 12 and the graphene film 15 are removed. The method for removing the oxide film 13 and the metal film 14 and the treatment liquid used for the removal are as described above.

Even after the oxide film 13 and the metal film 14 are removed, the graphene film 15 is held by the electrodes 23 from the sides of both end portions, so that the graphene film 15 is suspended between the electrodes 23.

Next, as shown in (d) of FIG. 5, an insulating film 33 covering an exposed surface of the graphene film 15 is formed. The insulating film 33 also functions as a support film for the graphene film 15.

The insulating film 33 shown in (d) of FIG. 5 is a film formed by the CVD. When the insulating film is formed by the ALD, as shown in (e) of FIG. 4, the exposed surface of the graphene film on the substrate side is also covered with the insulating film.

Therefore, an element 30 including the graphene film 15 is produced.

In the above method, since the element can also be produced without transferring the formed graphene film, it is possible to avoid the occurrence of breakage or structural defects in the graphene film due to peeling and attachment of the graphene film.

EXAMPLES

Hereinafter, the present invention will be described in detail with reference to Examples. However, the present invention is not limited to these examples. A blending amount of each component in tables described below is based on mass. Examples 2 to 5 and 9 are working examples, Example 8 is a comparative example, and Examples 1, 6, and 7 are reference examples.

Example 1

A synthetic quartz substrate (manufactured by AGC Electronics Inc.) having a size of 50 mm square, a thickness of 0.5 mm, and a thermal expansion coefficient of $0.6 \times 10^{-6}$ $(\text{K}^{-1})$ was prepared.

Next, the substrate was fixed to an in-chamber rotary jig of a load-lock type sputtering device (RAS-1100BII, manufactured by Shincron Co., Ltd.), and a Mg thin film was formed using a Mg target as a sputtering target. Subsequently, oxygen gas was introduced into a radical source to oxidize the Mg thin film. The rotary jig was rotated, and two processes of forming the Mg thin film and oxidation were repeatedly performed, to thereby form a MgO film having a thickness of about 1000 nm as an oxide film. Specific sputtering conditions for the MgO film are as follows.

(MgO Film Formation Conditions)

Target: Mg (3N)

Sputtering gas: Ar gas (flow rate: 150 sccm)

Supplied power: 6 kW

Reactive gas: $O_2$ (flow rate: 80 sccm)

RF power: 3 kW

Film formation pressure: 0.18 Pa

Rotation speed: 100 rpm

After the MgO film was formed by a post-oxidation sputtering method, the MgO film-attached substrate was annealed in an air atmosphere at 300° C. for 30 minutes.

The MgO film of the MgO film-attached substrate formed by the above method was subjected to the XRD measurement by the θ-2θ method.

Figure 6:
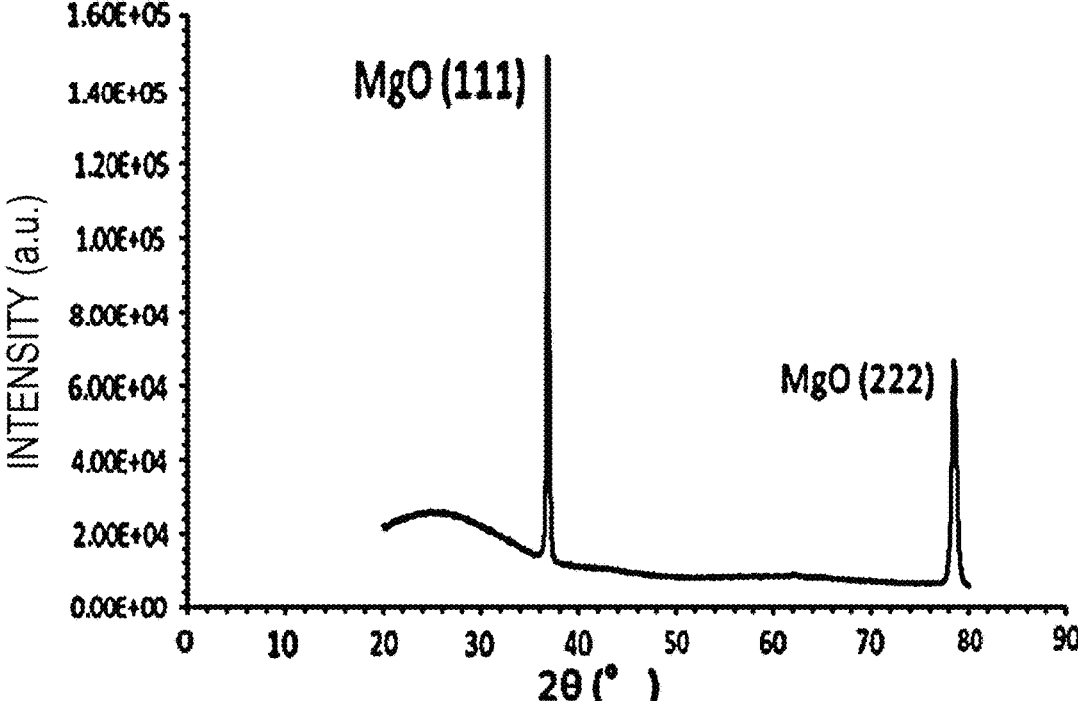
FIG. 6 shows an example of a chart obtained by XRD measurement for a MgO film of a MgO film-attached substrate.

FIG. 6 shows a chart obtained by the XRD measurement for the MgO film-attached substrate. As shown in FIG. 6, in the obtained XRD chart, only the diffraction peaks 3A derived from the (111) plane and the (222) plane of MgO were observed, and the diffraction peak 3B other than the diffraction peaks 3A was not observed. From the above, it is confirmed that the MgO film satisfying the requirement 3 and having excellent orientation is disposed on the surface of the synthetic quartz substrate.

Example 2

A MgO film-attached substrate including a MgO film having a thickness of about 1000 nm as an oxide film was prepared according to the method described in Example 1 except that the RF power was set to 2 kW and a film formation time was adjusted.

The obtained MgO film-attached substrate was mounted in a chamber of a multi-target sputtering device (a magnetron sputtering device manufactured by Seinan Industries Co., Ltd). While an Ar gas was flowed as a sputtering gas into the chamber, a Cu metal was sputtered on the surface of the MgO film-attached substrate on which the MgO film was disposed. The sputtering was repeated to form a Cu film having a thickness of about 1000 nm as a metal film on the surface of the MgO film, thereby preparing a composite substrate including the substrate, the MgO film (oxide film), and the Cu film (metal film), in this order.

Specific sputtering conditions for the Cu film are as follows.
(Cu Film Formation Conditions)
 Target: Cu
 Sputtering gas: Ar gas (flow rate: 150 sccm)
 Supplied power: 500 W
 Film formation pressure: 0.97 Pa
 Film formation temperature: 220° C.

After forming the Cu film, the obtained composite substrate was annealed at 600° C. in vacuum for 30 minutes.

The Cu film of the composite substrate formed by the above method was subjected to the XRD measurement by the θ-2θ method.

Figure 7:
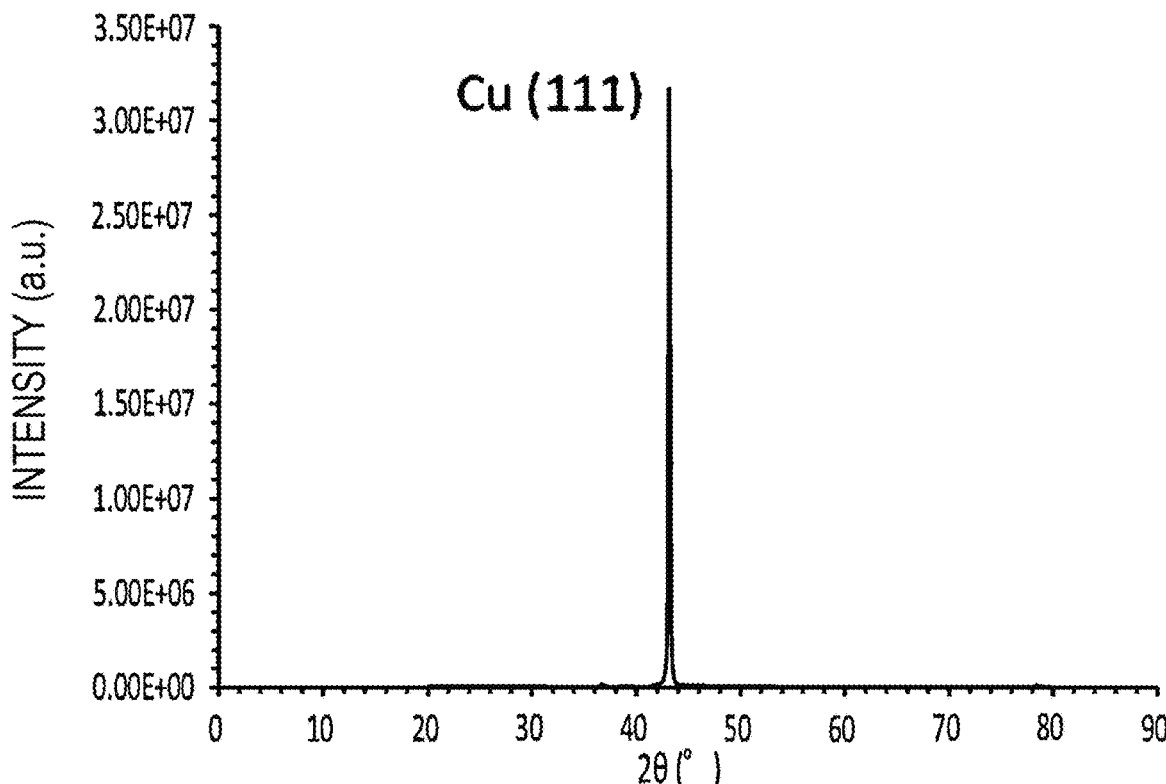
FIG. 7 shows an example of a chart obtained by XRD measurement for a Cu film of a composite substrate.

FIG. 7 shows a chart obtained by the XRD measurement for the composite substrate of Example 2. In the obtained XRD chart, the presence of the diffraction peak 1A derived from the (111) plane and the diffraction peak 1B derived from the (200) plane as the diffraction peaks derived from the lattice plane of the Cu crystal was confirmed, whereas the intensity of the diffraction peak 1B was about 1/480 of the intensity of the diffraction peak 1A, and the diffraction peak 1B was a peak corresponding to the "peak that is not observed". Therefore, it is confirmed that the composite substrate prepared in Example 2 satisfies the requirement 1.

For the diffraction peak 1A derived from the (111) plane of Cu observed in the above XRD chart, the peak intensity (integral intensity) was 5271984 and the half-width was 0.142°.

Example 3

A MgO film-attached substrate was prepared according to the method described in Example 1 except that the film formation time of the Mg thin film was adjusted to form a MgO film with a thickness of about 500 nm as the oxide film.

As a result of performing the XRD measurement for the formed MgO film by the θ-2θ method, in the obtained XRD chart, only the diffraction peaks 3A derived from the (111) plane and the (222) plane of MgO were observed, and the diffraction peak 3B other than the diffraction peaks 3A was not observed. From the above, it is confirmed that the MgO film-attached substrate was prepared in which the MgO film satisfying the requirement 3 and having excellent orientation was disposed on the surface of the synthetic quartz substrate.

Except for using the prepared MgO film-attached substrate, the Cu film having a thickness of about 1000 nm was formed as a metal film on the surface of the MgO film according to the method described in Example 2, thereby preparing a composite substrate including the substrate, the MgO film (oxide film), and the Cu film (metal film), in this order.

The Cu film of the formed composite substrate was subjected to the XRD measurement by the θ-2θ method.

Figure 8:
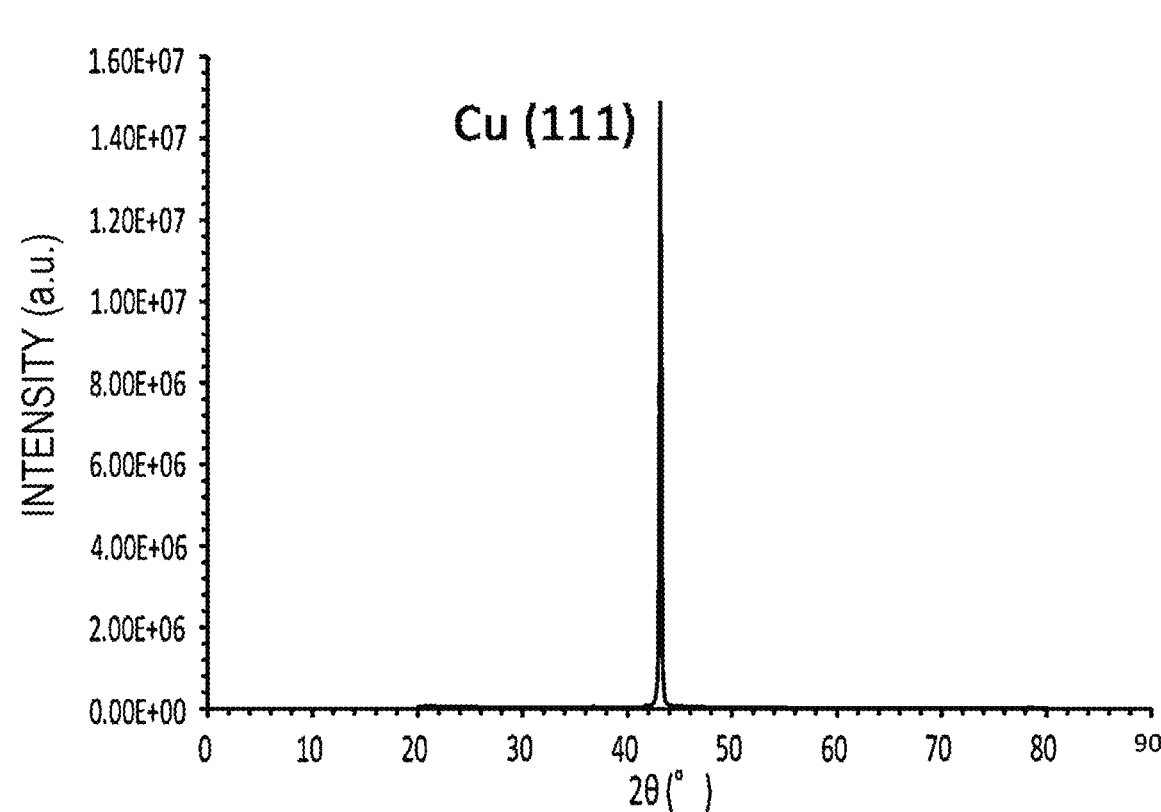
FIG. 8 shows another example of a chart obtained by XRD measurement for the Cu film of the composite substrate.

FIG. 8 shows a chart obtained by the XRD measurement for the composite substrate of Example 3. In the obtained XRD chart, the presence of the diffraction peak 1A derived from the (111) plane and the diffraction peak 1B derived from the (200) plane as the diffraction peaks derived from the lattice plane of the Cu crystal was confirmed, whereas the intensity of the diffraction peak 1B was about 1/680 of the intensity of the diffraction peak 1A, and the diffraction peak 1B was a peak corresponding to the "peak that is not observed". Therefore, it is confirmed that the composite substrate prepared in Example 3 satisfied the requirement 1.

For the diffraction peak 1A derived from the (111) plane of Cu observed in the above XRD chart, the peak intensity (integral intensity) was 12388568 and the half-width was 0.16°.

Example 4

A MgO film-attached substrate was prepared according to the method described in Example 1 except that the film formation time of the Mg thin film was adjusted to form a MgO film with a thickness of about 100 nm as the oxide film.

As a result of performing the XRD measurement for the formed MgO film by the θ-2θ method, in the obtained XRD chart, only the diffraction peaks 3A derived from the (111) plane and the (222) plane of MgO were observed, and the diffraction peak 3B other than the diffraction peaks 3A was not observed. From the above, it is confirmed that the MgO film-attached substrate was prepared in which the MgO film satisfying the requirement 3 and having excellent orientation was disposed on the surface of the synthetic quartz substrate.

Except for using the prepared MgO film-attached substrate, the Cu film having a thickness of about 1000 nm was formed as a metal film on the surface of the MgO film according to the method described in Example 2, thereby preparing a composite substrate including the substrate, the MgO film (oxide film), and the Cu film (metal film), in this order.

The Cu film of the formed composite substrate was subjected to the XRD measurement by the θ-2θ method.

Figure 9:
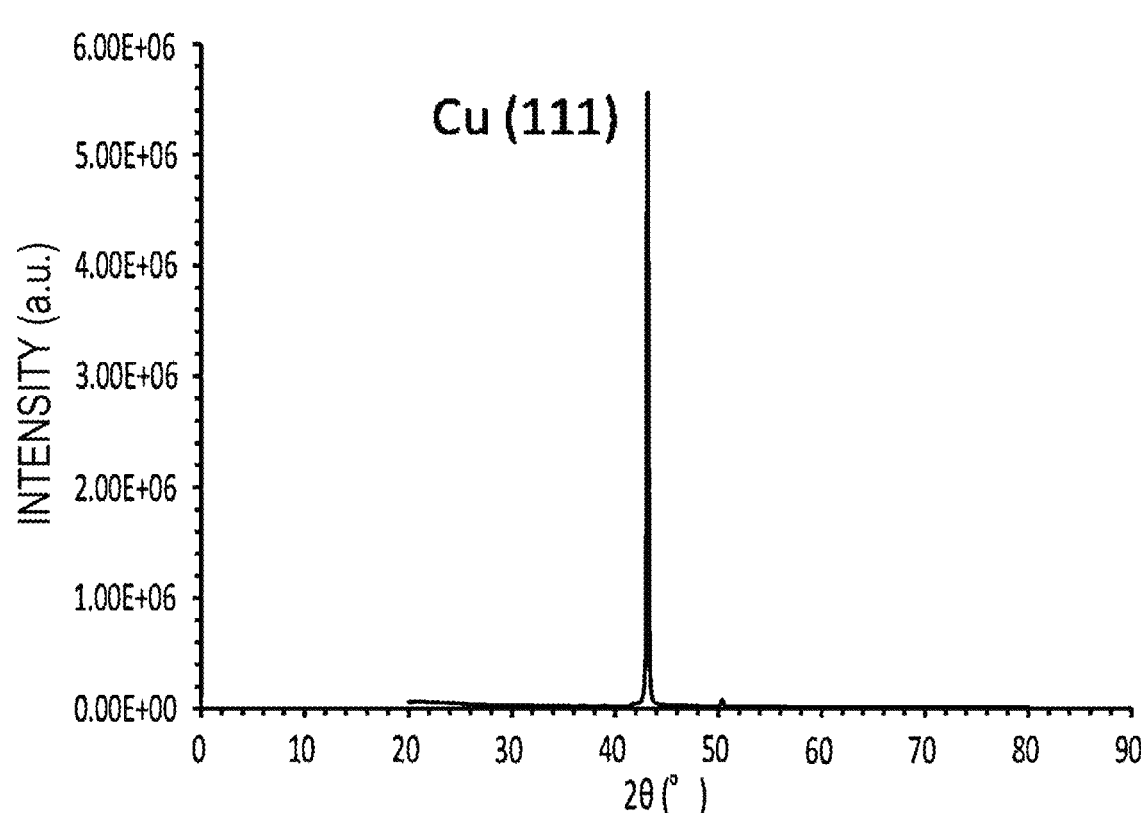
FIG. 9 shows another example of a chart obtained by XRD measurement for the Cu film of the composite substrate.

FIG. 9 shows a chart obtained by the XRD measurement for the composite substrate of Example 4. In the obtained XRD chart, the presence of the diffraction peak 1A derived from the (111) plane and the diffraction peak 1B derived from the (200) plane as the diffraction peaks derived from the lattice plane of the Cu crystal was confirmed, whereas the intensity of the diffraction peak 1B was about $1/70$ of the intensity of the diffraction peak 1A, and the diffraction peak 1B was a peak corresponding to the "peak that is not observed". Therefore, it is confirmed that the composite substrate prepared in Example 4 satisfied the requirement 1.

For the diffraction peak 1A derived from the (111) plane of Cu observed in the above XRD chart, the peak intensity (integral intensity) was 910607 and the half-width was 0.15°.

Example 5

Using the MgO film-attached substrate prepared in Example 1, a composite substrate is produced by the following method.

The MgO film-attached substrate is mounted in a chamber of a magnetron sputtering device. The inside of the chamber is set to be under Ar atmosphere and a degree of vacuum of about 0.3 Pa to 1.0 Pa, and a Ni metal is sputtered on a surface on which the MgO film is disposed while the MgO film-attached substrate is heated to 200° C. to 300° C. Accordingly, a Ni film is deposited as a metal film on the surface of the MgO film, and a composite substrate including the substrate, the MgO film (oxide film), and the Ni film (metal film), in this order is prepared.

By using the MgO film-attached substrate having excellent orientation obtained in Example 1, a Ni film satisfying the requirement 2 is formed.

Example 6

A Cu film was formed on a surface of a MgO single crystal substrate by the following method.

A MgO single crystal substrate having a size of 50 mm square, a thickness of 0.5 mm, and a thermal expansion coefficient of $13.5 \times 10^{-6}$ $(K^{-1})$ was prepared. A surface of the MgO single crystal substrate was subjected to the XRD measurement by the θ-2θ method.

Next, the substrate was fixed in a chamber of a multi-target sputtering device (a magnetron sputtering device manufactured by Seinan Industries Co., Ltd.). An Ar gas as a sputtering gas was continuously supplied into the chamber at a flow rate of 50 sccm, and a Cu metal was sputtered on the surface of the MgO single crystal substrate heated to 220° C. under conditions of a gas pressure of 0.34 Pa and power of 500 W (power density of 5.26 $W/cm^2$). Accordingly, a Cu film was formed on a surface of a MgO single crystal substrate.

A surface of the formed Cu film was subjected to the XRD measurement by the θ-2θ method.

Figure 10:
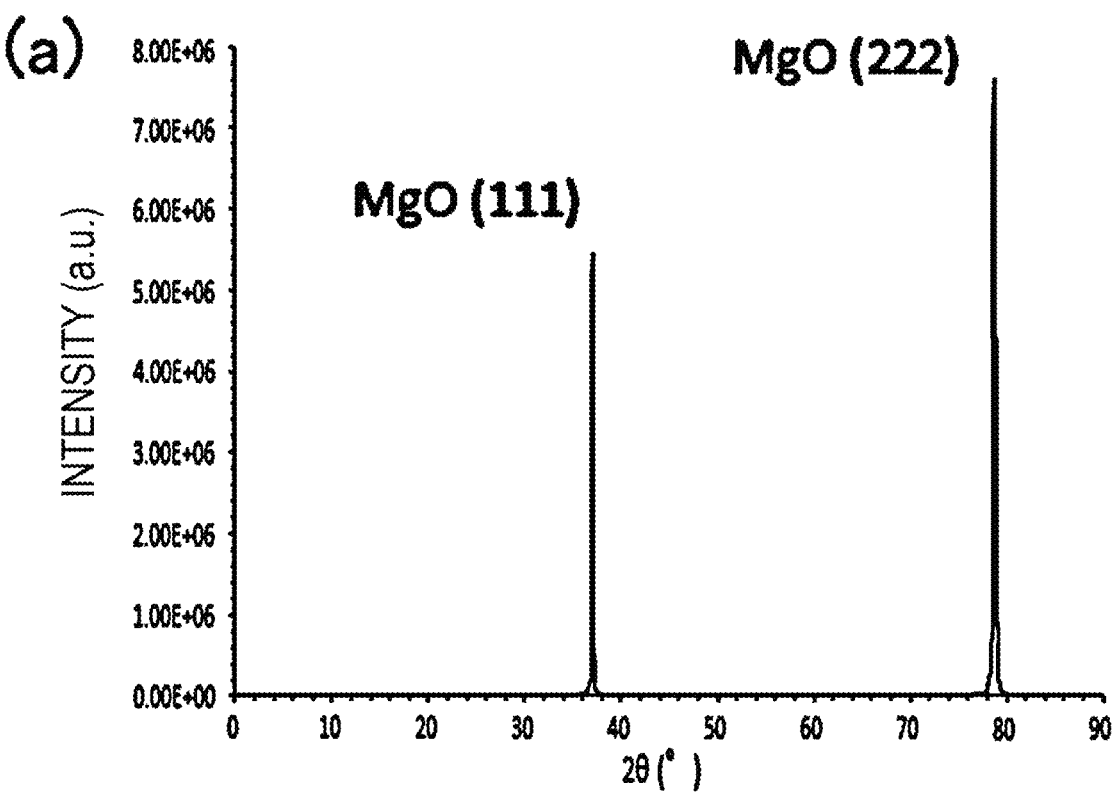
FIG. 10 (a) and (b) of FIG. 10 show an example of charts obtained by XRD measurement for a MgO single crystal substrate and a Cu film formed on a surface of the MgO single crystal substrate.
Figure 10:
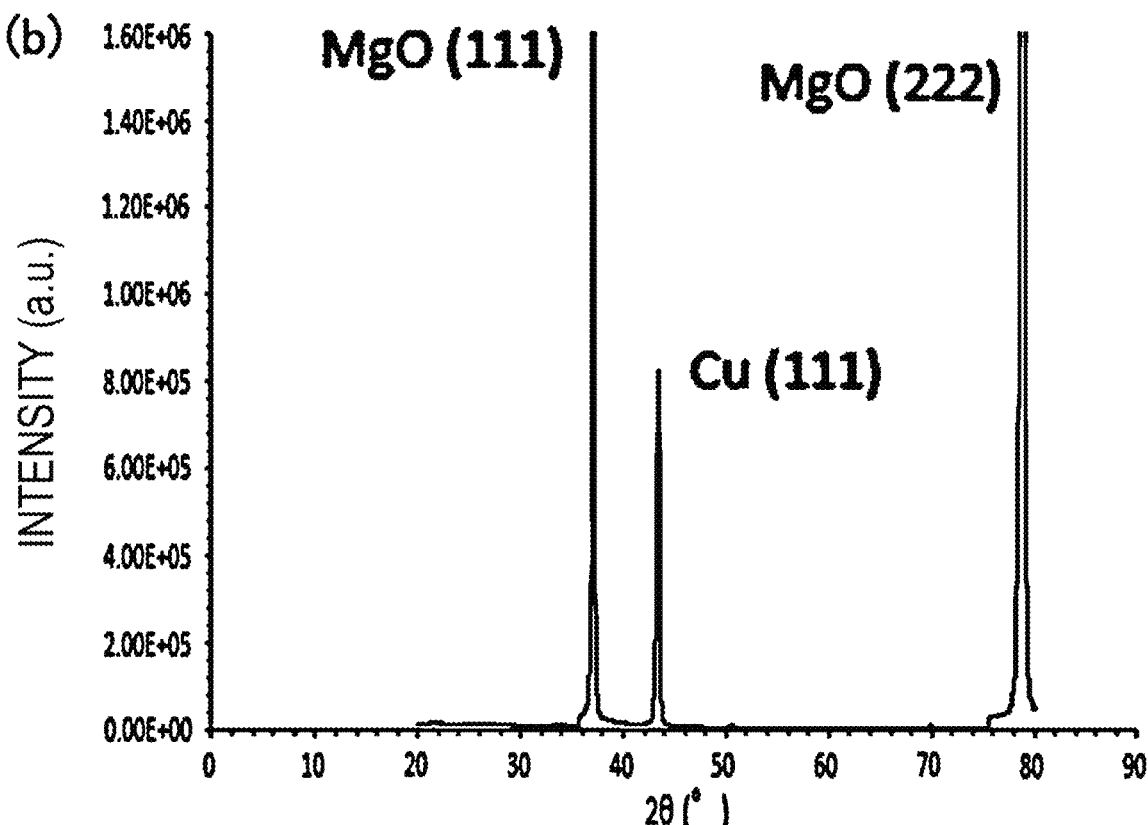

FIG. 10 shows an XRD chart ((a) of FIG. 10) showing a result of the XRD measurement performed on the surface of the MgO single crystal substrate, and an XRD chart ((b) of FIG. 10) showing a result of the XRD measurement performed on the surface of the Cu film formed by the above method.

As shown in (a) of FIG. 10, in the XRD chart for the MgO single crystal substrate, only the diffraction peak 3A derived from the (111) plane of MgO and the diffraction peak derived from the (222) plane were observed, and the diffraction peak 3B was not observed. Therefore, it is confirmed by the XRD measurement that MgO on the surface of the MgO single crystal substrate has excellent orientation.

In addition, as shown in (b) of FIG. 10, in the XRD chart for the Cu film formed on the surface of the MgO single crystal substrate, among the diffraction peaks derived from the lattice planes of the Cu single crystal, only the diffraction peak 1A derived from the (111) plane of Cu was observed, and the diffraction peak 1B was not observed. In this way, it is confirmed that the Cu film formed on the surface of the MgO single crystal substrate having excellent orientation satisfied the requirement 1 and had excellent orientation.

Example 7

A Cu film was formed on a surface of a sapphire $(\alpha\text{-}Al_2O_3)$ single crystal substrate by the following method.

A sapphire single crystal substrate having a size of 20 mm square, a thickness of 1 mm, and a thermal expansion coefficient of $5.2 \times 10^{-6}$ $(K^{-1})$ to $5.5 \times 10^{-6}$ $(K^{-1})$ was prepared. A surface of the sapphire single crystal substrate was subjected to the XRD measurement by the θ-2θ method.

Next, a Cu film having a thickness of about 1000 nm was formed on the surface of the sapphire single crystal substrate according to the method described in Example 2 except that the sapphire single crystal substrate was used instead of the MgO film-attached substrate, thereby preparing a Cu film-attached sapphire single crystal substrate.

A surface of the formed Cu film was subjected to the XRD measurement by the θ-2θ method.

Figure 11:
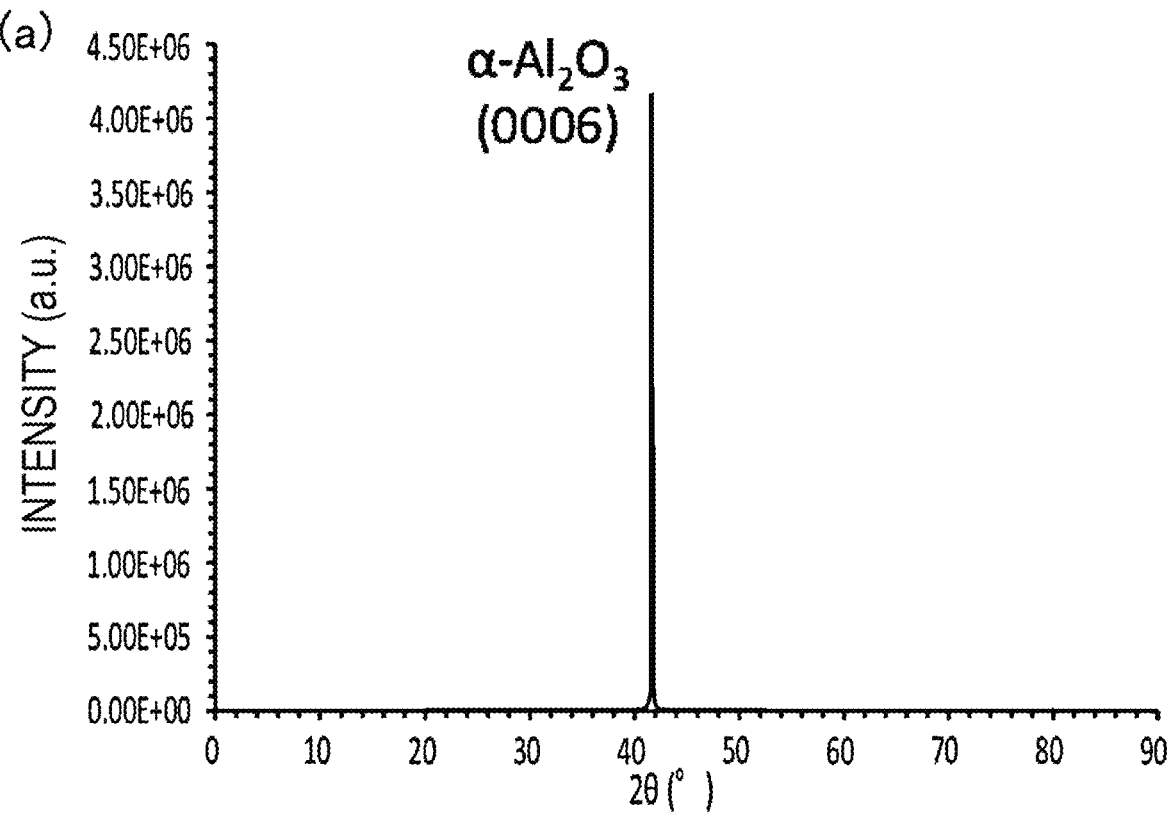
FIG. 11 (a) and (b) of FIG. 11 show an example of charts obtained by XRD measurement for a sapphire single crystal substrate and a Cu film formed on a surface of the sapphire single crystal substrate.
Figure 11:
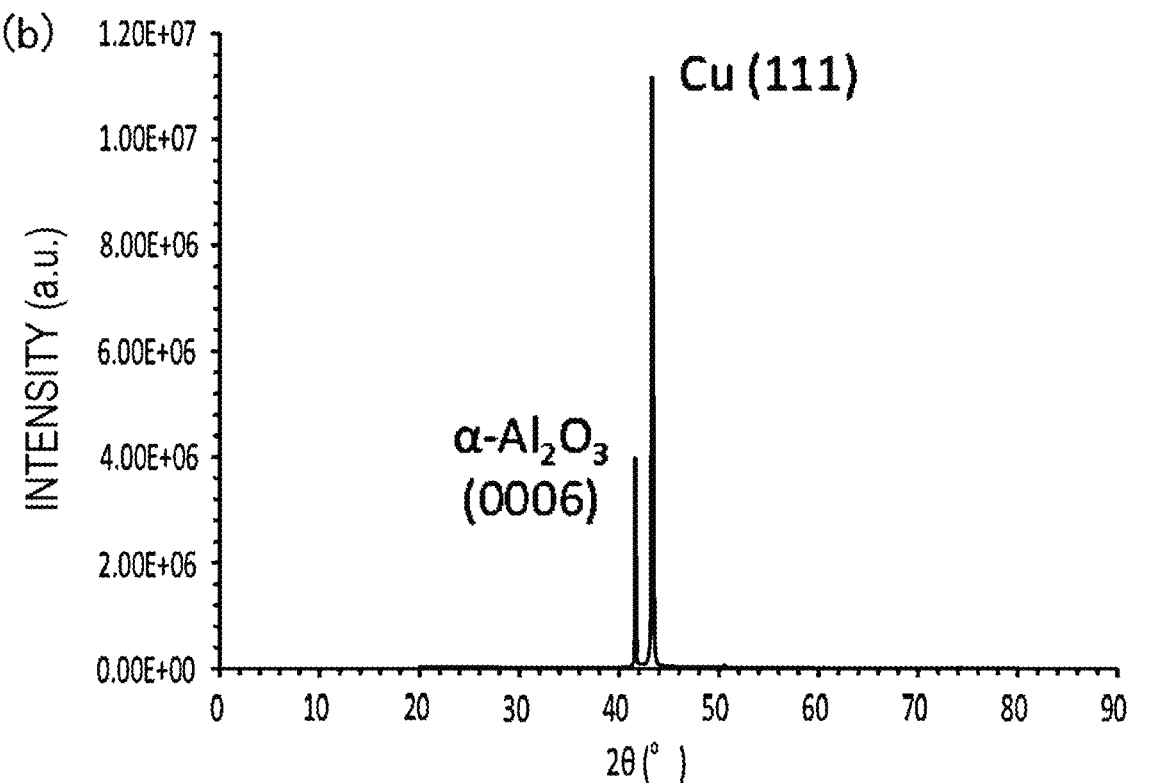

FIG. 11 shows an XRD chart ((a) of FIG. 11) showing a result of the XRD measurement performed on the surface of the sapphire single crystal substrate, and an XRD chart ((b) of FIG. 11) showing a result of the XRD measurement performed on the surface of the Cu film formed by the above method.

As shown in (a) of FIG. 11, in the XRD chart for the sapphire single crystal substrate, only the diffraction peak 4A derived from the (0001) plane of $\alpha\text{-}Al_2O_3$ was observed, and the diffraction peak 4B was not observed. Therefore, it is confirmed by the XRD measurement that $Al_2O_3$ on the surface of the sapphire single crystal substrate had excellent orientation.

In addition, as shown in (b) of FIG. 11, in the XRD chart for the Cu film formed on the surface of the sapphire single crystal substrate, the presence of the diffraction peak 1A derived from the (111) plane and the diffraction peak 1B derived from the (200) plane as the diffraction peaks derived from the lattice plane of the Cu crystal was confirmed, whereas the intensity of the diffraction peak 1B was about $1/160$ of the intensity of the diffraction peak 1A, and the diffraction peak 1B was a peak corresponding to the "peak that is not observed". Therefore, it is confirmed that the composite substrate prepared in Example 4 satisfied the requirement 1. In this way, it is confirmed that the Cu film formed on the surface of the sapphire single crystal substrate having excellent orientation satisfied the requirement 1 and had excellent orientation.

Example 8

A Cu film was formed on a surface of a synthetic quartz substrate by the following method.

The synthetic quartz substrate (manufactured by AGC Electronics Inc.) used in Example 1 was prepared, which had a size of 50 mm square, a thickness of 0.5 mm, and a thermal expansion coefficient of $0.6 \times 10^{-6}$ $(K^{-1})$.

Next, a Cu film having a thickness of about 1000 nm was formed on a surface of the synthetic quartz substrate as a metal film according to the method described in Example 2 except that the synthetic quartz substrate was used instead of the MgO film-attached substrate, thereby preparing a Cu film-attached synthetic quartz substrate.

A surface of the formed Cu film was subjected to the XRD measurement by the θ-2θ method.

Figure 12:
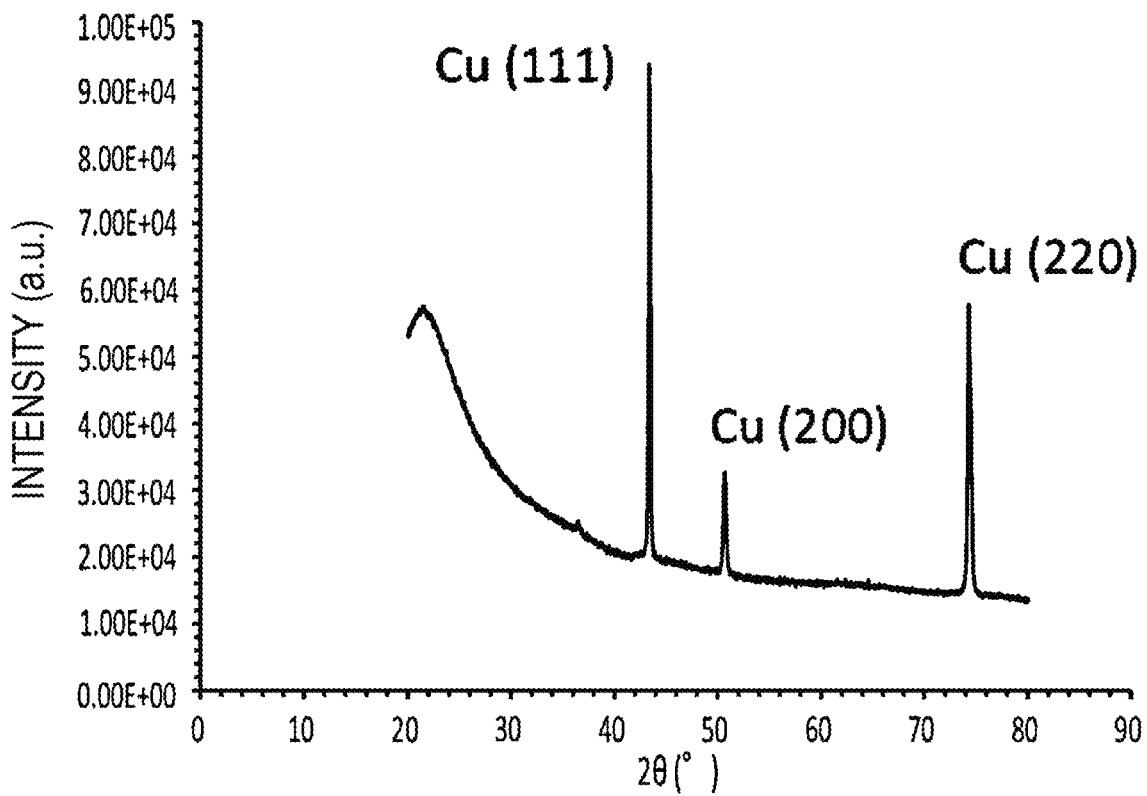
FIG. 12 shows an example of a chart obtained by XRD measurement for a Cu film formed on a surface of a synthetic quartz substrate.

FIG. 12 shows a chart obtained by the XRD measurement for the surface of the Cu film formed by the above method.

In the XRD chart shown in FIG. 12, the diffraction peaks derived from the (111) plane, the (200) plane, and the (220) plane of Cu were observed as diffraction peaks derived from the lattice planes of the Cu single crystal. A ratio of the peak intensities of the observed diffraction peaks was {(111) plane:(200) plane:(220) plane}={3.2:1:3.2}. Therefore, it is confirmed that the Cu film directly formed on the surface of the synthetic quartz substrate did not satisfy the requirement 1.

The intensities of the diffraction peaks observed in Example 8 were significantly lower than those of the diffraction peaks derived from the (111) plane of Cu observed in Examples 6 and 7, and thus it is confirmed that, when the Cu film was directly formed on the surface of the synthetic quartz substrate, the obtained Cu film had poor crystallinity.

Example 9

A laminate is produced by forming a graphene film on the surface of the metal film of the composite substrate prepared in Examples 2 to 5 by the CVD method.

Specifically, a horizontal tubular furnace is used, and the composite substrate produced in Examples 2 to 5 is placed in a center of a quartz tube attached to the tubular furnace. The composite substrate placed in the quartz tube is heated to 500° C. under an Ar atmosphere, and then annealed with hydrogen, and the inside of the quartz tube is replaced with Ar. Next, the temperature is increased to 900° C., and then methane and hydrogen as carbon materials are flowed into the quartz tube to form the graphene film. Next, the atmosphere in the quartz tube is replaced with Ar, and a sample is quickly taken out from a heating zone and rapidly cooled. A flow rate of an argon gas in a heating process and a cooling process is 200 sccm, the flow rates of the argon gas and a hydrogen gas during the hydrogen annealing are 600 sccm and 500 sccm, respectively, and the flow rates of a methane gas and the hydrogen gas in the CVD are 50 sccm and 1500 sccm, respectively.

By appropriately adjusting each condition based on the above-described production conditions, a laminate including a graphene film is produced.

The laminate produced by the above method has excellent orientation and has a metal film on its surface having a crystal structure that matches the lattice constituting graphene, so that a highly oriented graphene film can be obtained. Further, by using a substrate that has a low thermal expansion coefficient and is unlikely to undergo thermal expansion even when heated to a high temperature, the substrate does not contract even when cooled to 20 to 25° C. after the graphene film is formed in a high-temperature environment, and thus the occurrence of folds in the graphene film can be prevented.

The effect of preventing the occurrence of such a fold is particularly advantageous because the fold is likely to occur in a graphene single film when the substrate is cooled down in forming the graphene single film having a thickness of one carbon atom by a CVD method.

Although various embodiments have been described above with reference to the drawings, it is needless to say that the present invention is not limited to such examples. It is obvious for a person skilled in the art that various modifications and variations can be made within the category described in the scope of claims and it is understood that such modifications and variations naturally belong to the technical scope of the present invention. Further, the components described in the above embodiment may be combined in any manner without departing from the gist of the invention.

The present application is based on a Japanese Patent Application (No. 2022-039884) filed on Mar. 15, 2022 and a Japanese Patent Application (No. 2022-120201) filed on Jul. 28, 2022, the contents of which are incorporated herein by reference.

REFERENCE SIGNS LIST

1, 11: composite substrate
2, 12: substrate
3, 13: oxide film
4, 14: metal film
5, 15: graphene film
6, 10: laminate
20, 30: element
16, 21, 32: resist film
22: opening
23, 31: electrode
24, 33: insulating film

The invention claimed is:

1. A composite substrate for graphene film production, the composite substrate comprising:
a substrate having a thermal expansion coefficient of $2.0 \times 10^{-6}$ $(K^{-1})$ or less;
an oxide film; and
a metal film containing Cu or Ni, in this order, wherein the composite substrate satisfies the following requirement 1 or requirement 2:
requirement 1: the metal film contains Cu, a diffraction peak 1A derived from either a (111) plane or a (100) plane is observed by XRD measurement for the metal film by a θ-2θ method, and in a chart obtained by the XRD measurement, a diffraction peak derived from a lattice plane of a Cu crystal other than the diffraction peak 1A is not observed, or an intensity of any diffraction peak derived from the lattice plane of the Cu crystal other than the diffraction peak 1A is 1/10 or less of an intensity of the diffraction peak 1A, and
requirement 2: the metal film contains Ni, a diffraction peak 2A derived from a (111) plane is observed by a XRD measurement for the metal film by a θ-2θ method, and in a chart obtained by the XRD measurement, a diffraction peak derived from a lattice plane of a Ni crystal other than the diffraction peak 2A is not observed, or an intensity of any diffraction peak derived from the lattice plane of the Ni crystal other than the diffraction peak 2A is 1/10 or less of an intensity of the diffraction peak 2A.

2. The composite substrate according to claim 1, wherein the metal film has a thickness of 50 nm to 2000 nm.

3. The composite substrate according to claim 1, wherein the oxide film has a thickness of 10 nm to 2000 nm.

4. The composite substrate according to claim 1, wherein the oxide film contains MgO or $Al_2O_3$.

5. The composite substrate according to claim 1, wherein the substrate has a thickness of 0.2 mm or more.

6. A laminate comprising: the composite substrate according to claim 1; and a graphene film disposed on the metal film contained in the composite substrate.

7. A method for producing the composite substrate according to claim 1, the method comprising:

forming the oxide film on a surface of the substrate by a method selected from the group consisting of sputtering, pulsed laser deposition, and vapor deposition; and then forming the metal film on a surface of the oxide film by a method selected from the group consisting of sputtering, pulsed laser deposition, and vapor deposition.

8. A method for producing the laminate according to claim 6, the method comprising:

forming the graphene film on a surface of the metal film contained in the composite substrate by chemical vapor deposition.

* * * * *